Patented July 16, 1935

2,008,056

UNITED STATES PATENT OFFICE 2,008,056

PROCESS OF PREPARING 1,4-DIAMINO-ANTHRAQUINONE-2,3,X-TRISULPHONIC ACIDS

Fritz Baumann, Leverkusen-I. G. Werk, Germany, assignor to General Aniline Works, Inc., New York, N. Y., a corporation of Delaware No Drawing. Application May 22, 1933, Serial No. 672,351. In Germany May 23, 1932

3 Claims. (Cl. 260—60)

The present invention relates to a process of preparing 1,4-diaminoanthraquinone-2,3,x-trisulphonic acids and to the new 1,4-diaminoanthraquinone-trisulphonic acids obtainable by said process.

In accordance with the invention an 1,4-diamino-2,3-dihalogenanthraquinone-x-sulphonic acid is caused to react with a water soluble neutral sulphite, such as an alkali metal sulphite or ammonium sulphite, in the presence of water, while heating the reaction mixture.

The anthraquinone derivatives used as starting materials correspond to the probable formula:—

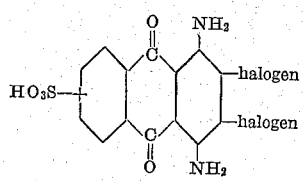

and can be prepared, for example, by sulphonating an 1,4-diamino-2,3-dihalogenanthraquinone by means of fuming sulphuric acid of between about 12 and about 30% strength at a temperature of about 100° C. and about 160° C.; (see my copending application Serial No. 589,062, filed January 26, 1932) or by halogenating 1,4-diaminoanthraquinone containing a sulphonic acid group in the nucleus not containing the amino groups.

As outlined above, the reaction is performed at elevated temperature, preferred temperature ranges being those between about 70 and about 100° C. Higher and lower temperatures are likewise operable but inconvenient, since in the latter case the reaction performs rather slowly, while in case of applying higher temperatures than 100° C. the application of superatmospheric pressure will be necessary. The neutral water soluble sulphite is advantageously applied in an amount at least corresponding to the amount theoretically necessary for the replacement of the two halogen atoms. In case lower amounts are applied, part of the starting material will remain unchanged, whereas substantially larger amounts of the sulphite are also operable but unnecessary. The use of a small excess of the sulphite is of advantage in many cases.

When working in the manner above described there are obtained the compounds having in their free form the probable formula:—

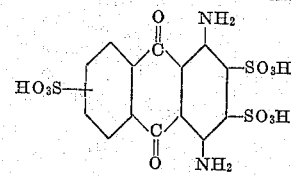

They can be easily isolated from their aqueous solutions in form of their alkali metal salts, for example, in form of their potassium salts, and it is to be mentioned that the salts of the sulphonic acids in question are considered to be equivalents to the free sulphonic acids.

The new compounds dissolve in concentrated sulphuric acid without coloration, turning to blue at the addition of boric acid or formaldehyde. In water the new compounds, the potassium salts of which form blue violet to blue needles, dissolve with a blue coloration and dye wool from an acid bath clear blue shades of excellent fastness properties.

The following examples illustrate the invention, without limiting it thereto, the parts being by weight:—

Example 1

100 parts of the sulphonic acid obtainable by sulphonating 1,4-diamino-2,3 - dichloroanthraquinone in the presence of boric acid are suspended in 600 parts of water and heated while stirring to a temperature of 95–100° C. To this suspension a solution of 130 parts of crystallized sodium sulphite in 600 parts of water is gradually added in the course of 1½ hours. The originally violet colored solution slowly turns to a blue one. After the addition of the sulphite solution stirring is continued, while maintaining the temperature at 95–100° C., until a test portion does not change any more in water. Finally, the clear blue solution is salted out by means of potassium chloride at a temperature of 80–90° C. On cooling, the potassium salt of the reaction product crystallizes in small blue needles and can be sucked off at a temperature of 40° C. The trisulphonic acid is thus obtained in a very good yield. After drying, it forms a blue powder which dissolves in water with a clear blue coloration. The colorless solution in sulphuric acid turns to blue at the addition of paraformaldehyde or boric acid.

It dyes wool from an acid bath vivid blue shades of excellent fastness properties.

*Example 2*

10 parts of the starting material as described in Example 1 and 10 parts of crystallized potassium sulphite are heated to 100° C. for about 1½ hours within 150 parts of water, until the clear blue dyestuff solution does not change any more. The trisulphonic acid formed is identical with the dyestuff described in Example 1 and may be separated as potassium salt in the same manner as described in Example 1.

A similar dyestuff may be obtained by treating 1,4 - diamino - 2,3 - dichloroanthraquinone-5-sulphonic acid (obtainable by chlorinating 1,4-diaminoanthraquinone - 5 - sulphonic acid) with potassium sulphite.

When starting in the above examples instead of the dichloroanthraquinone derivatives with the corresponding dibromo compounds, the same dyestuffs are obtained.

I claim:—

1. The process which comprises heating a compound having in its free form the formula:—

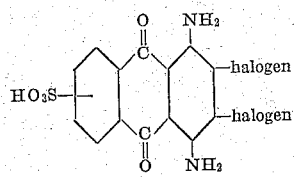

with a water soluble neutral sulphite, in the presence of water.

2. The process which comprises heating a compound having in its free form the formula:—

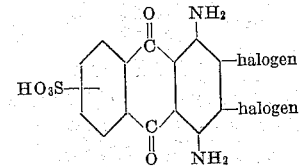

with a water soluble alkali metal sulphite in the presence of water at a temperature of between about 70 and about 100° C.

3. The compounds having in their free form the general formula:—

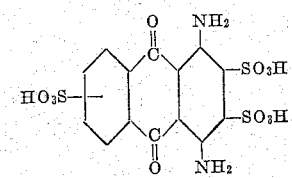

said compounds being in form of their potassium salts blue-violet to blue crystals, soluble in water with a blue coloration, turning to blue on the addition of boric acid or formaldehyde dyeing wool from an acid bath clear blue shades of excellent fastness properties.

FRITZ BAUMANN.